Figure 1:
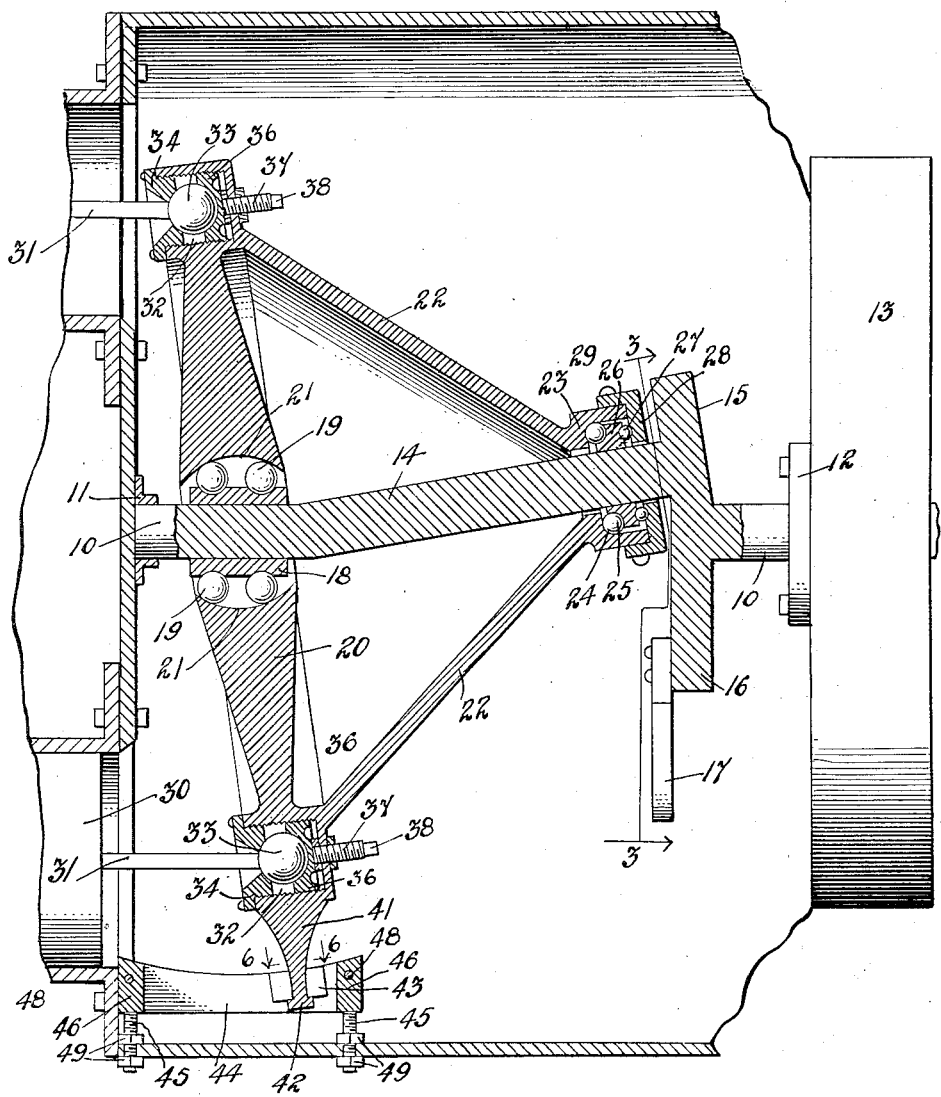

June 27, 1933.  W. WILLS  1,915,966
MECHANICAL MOVEMENT
Filed July 6, 1932  2 Sheets-Sheet 1

WITNESS:
INVENTOR
William Wills
BY
HIS ATTORNEY

June 27, 1933. W. WILLS 1,915,966
MECHANICAL MOVEMENT
Filed July 6, 1932 2 Sheets-Sheet 2
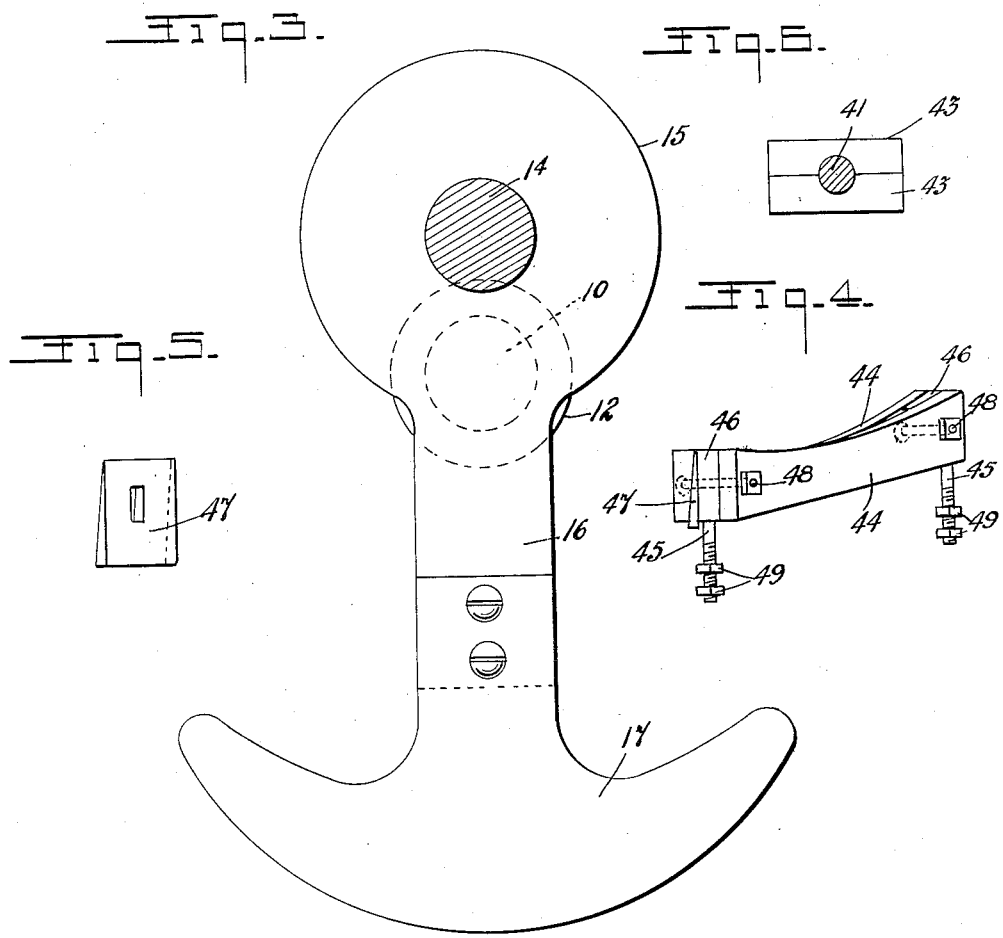
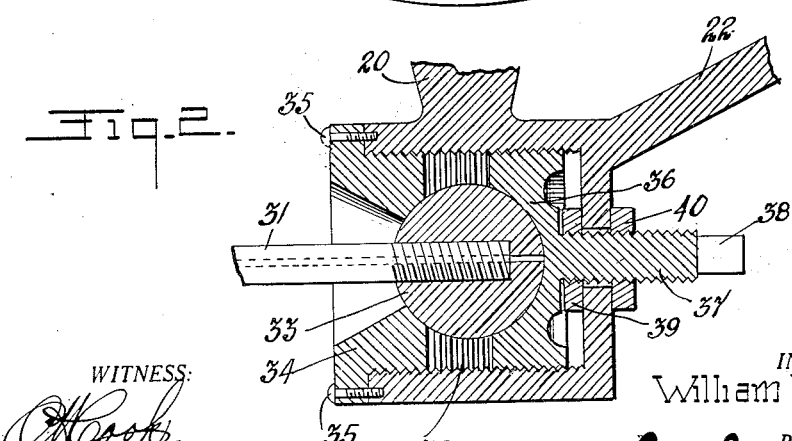
INVENTOR
William Wills
BY
Joshua R. H. Potts
HIS ATTORNEY Patented June 27, 1933

1,915,966

UNITED STATES PATENT OFFICE

WILLIAM WILLS, OF PHILADELPHIA, PENNSYLVANIA, ASSIGNOR TO WILLS MOTOR CO., INC., OF PHILADELPHIA, PENNSYLVANIA, A CORPORATION OF PENNSYLVANIA

MECHANICAL MOVEMENT

Application filed July 6, 1932. Serial No. 621,018.

This invention relates to mechanical movements, and has for an object to provide the movement employed in an internal combustion engine of the "wabble motor type".

A further object of the invention is to provide an improved type of wabbler, with its associated parts for translating the thrust of pistons into rotary motion.

A further object of the invention is to provide a wabbler constructed as a cone, or an analogous device which receives at its base the thrust of the pistons and its apex translates the wabble imparted thereto by the pistons into rotary action by the coaction with the shaft inclined to the line of rotation.

A further object of the invention is to provide improved means for mounting and maintaining the wabbler in operative position.

The invention therefore comprises a shaft having intermediate its ends a part inclined to the line of rotation, said inclined part being embraced by a part analogizing a cone, the base of which is mounted to wabble upon a part of the shaft coinciding with the axis of rotation while its apex is journaled adjacent to the line of greatest divergence of the inclined part from the axis of rotation.

The drawings illustrate an embodiment of the invention and the views therein are as follows:

Figure 1 is a view of the mechanical movement, taken on a plane substantially diametrical to the wabbler, Figure 2 is a detail view of the means connecting one of the piston connecting rods with the wabbler, Figure 3 is a sectional view taken on line 3—3 of Figure 1 and shown on an enlarged scale, Figure 4 is a perspective view of the guide for maintaining the wabbler against rotary movement, Figure 5 is a persepctive view of the wedge employed in the guide, and Figure 6 is a sectional view taken on line 6—6 of Figure 1, showing in top plan the blocks operating in conjunction with the guides.

Like characters of reference indicate corresponding parts throughout the several views.

The improved mechanical movement which forms the subject matter of the present application comprises a shaft 10 which is journaled in any approved manner. At 11, a conventional bearing is shown, and at 12 a disk is provided which may be rigidly secured to the balance wheel 13.

Intermediate the ends of the shaft 12, a section 14 is provided which is at an angle to the axis of rotation of the shaft. This is provided by means of an offset 15 which is rigidly connected with both the shaft 10 and the inclined section 14 as by making these parts integral, but it is to be understood that integrality is not essential.

The offset is provided with an arm 16 opposite the shaft 14 and a counterweight 17 is secured thereto. This is made separate from the arm 16 for the purpose of varying the counterweight as may be necessary for an accurate balance, but it is to be understood that the weight may be formed integral with the arm and still be within the scope of the present invention.

The shaft 10 is provided with a collar 18 located adjacent to the line of divergence of the inclined section 14. This collar 18 provides a plurality of ball races for the balls 19. In the drawings, two rows of balls 19 are shown. It is to be understood, of course, that a single row of balls or a greater number of rows of balls are within the scope of the present invention.

The wabbler comprises a base member 20 which is provided axially with curvatures 21 properly proportioned to ride upon the balls 19 and to permit the wabbling of the base 20 relative thereto, one of said positions being shown at Figure 1.

The base 20 is provided with conical sides 22 which terminate in a ring 23 truncating the cone. The ring 23 provides a ball race 24 for the balls 25 which engage against the abutment 26 rigidly secured to the inclined part 14 of the shaft. The abutment 26 also provides a ball race for the balls 27 which are also engaged by the annulus 28 secured to the ring 23 as by the screws 29.

Spaced about the base of the cone 22 are a plurality of connections for connecting the wabbler with the pistons 30 through the medium of the connecting rods 31. It is obvious, of course, that any number of cylinders and accompanying pistons may be employed and the connections of the wabbler will correspond to the number thus provided.

These connections comprise threaded sockets 32 within which a ball 33 at the end of the connecting rod 31 is maintained by means of a bushing 34 which is threaded into the threaded socket 32 and maintained therein in any approved manner as by one or more screws 35.

To coact with the bushing 34, a socket member 36 is employed which of necessity must be inserted into the socket 32 in advance of the ball 33 and bushing 34. This socket member is provided with a threaded shank 37 and with the terminal 38 which may be square or of other multi-angular shape for the receipt of a wrench or other tool by which the socket member 36 may be rotated in engagement with the threads of the socket 32. Lock nuts 39 and 40 are employed for maintaining the position of the socket member 36 after adjustment.

At some point about the perimeter of the base of the cone a web 41 is provided extending radially therefrom and terminating in a T-head 42. Embracing this web 41 and bearing upon the T-head 42 are a pair of blocks 43 which operate between guide members 44. These guide members 44 are spaced apart to receive blocks 43 and are rigidly secured to the housing of the device by means of bolts 45. These bolts 45 are provided with sections 46, spacing the guide bars 44 and together with wedges 47 holding said guide bars at the proper distance to accommodate the blocks 43. Binding bolts 48 are employed for exerting the necessary tension upon the guide bars to maintain them in proper position. The bolts 45 are secured to the housing in any approved manner as by the use of lock nuts 49.

In operation, the thrust of the connecting rods 31 will be applied in rotative sequence about the perimeter of the wabbler so that a wabbling motion will be imparted thereto in the well known manner of wabble motors. The base of the wabbler 20 will oscillate upon the balls 19 while the shaft 10 therein, together with the collar 18, will rotate therein, the wabbler being held against rotation, of course, by the guide bars 44 and the connection through the web 41.

The thrust of the connecting rods will be conveyed by the cone 22 to the balls 24 which, bearing against the abutment 26, will act upon the inclined section 14 of the shaft to rotate the inclined section about its axis of rotation corresponding to the axis of the shaft 10, whereby of course, the shaft 10 also rotates about its own axis.

The thrust of the connecting rods 31 through the medium of the balls 33 will, of course, eventually wear the connecting parts. Adjustment for wear is taken up by loosening the lock nuts 39 and 40 and adjusting the socket member 36 by the application of a wrench to the squared end 38, whereupon, the lock nuts 39 and 40 will be tightened to maintain the position of adjustment so acquired.

As wear occurs between the guide bars 44 and the blocks 43, adjustment will be made by first loosening the bolts 48, retracting the wedges 47 a sufficient amount and again tightening the bolts 48 to proper sliding fit with the blocks 43.

Of course, the mechanical movement herein illustrated may be modified and changed in various ways without departing from the invention herein set forth and hereinafter claimed.

The invention is hereby claimed as follows:

1. A mechanical movement comprising a shaft having a section inclined to its axis, a wabbler journaled upon an axial part of the shaft and comprising a cone having its apex journaled to the inclined section adjacent to its position of greatest divergence, and pistons connected with the cone.

2. A mechanical movement comprising a shaft having an intermediate section diverging from its axis of rotation, a collar embracing an axial part of the shaft and providing a ball race, a wabbler constructed as a cone, the base of which embraces the ball race, balls interposed between the ball race and the base, ball connections between the apex of the cone and the diverging section of the shaft approximately at the position of greatest divergence, and pistons positioned to deliver thrust to the base of the cone in circular series.

3. A mechanical movement comprising a shaft having a section diverging from the axis of rotation, a cone embracing said diverging section and having ball connections between the apex of the cone and a section of the shaft approximately at its position of greatest divergence, the base of said cone embracing an axial section of the shaft, ball connections between the shaft and the base of the cone providing for rotary movement of the shaft and wabbling movement of the base, and pistons positioned to deliver thrust to the perimeter of the base in circular progression.

4. A mechanical movement comprising a shaft having an intermediate section diverging from the axis of rotation, a cone axially embracing the diverging section and having its base embracing an axial section of the shaft at a position removed from the diverging section, said embracing part providing a circular opening having transversely arcuate walls, a ball race carried by the shaft, balls located in the ball race and engaging the arcuate circular opening of the base, and pistons positioned to deliver thrust to the cone at its base in circular progression.

5. In a mechanical movement a wabbler and a shaft carrying a series of balls, said shaft adapted to rotate with said balls in coaction with the wabbler, the wabbler wabbling upon the said balls the while.

In testimony whereof I have signed my name to this specification.

WILLIAM WILLS.